(12) United States Patent
Holley, II et al.

(10) Patent No.: US 9,015,375 B2
(45) Date of Patent: Apr. 21, 2015

(54) BUFFER CONTROLLER, CODEC AND METHODS FOR USE THEREWITH

(75) Inventors: Roderick Holley, II, Pflugerville, TX (US); Raymond L. Vargas, Austin, TX (US); John Gregory Ferrara, Naples, FL (US)

(73) Assignee: SIGMATEL, Inc., Austin, TX (US)

( * ) Notice: Subject to any disclaimer, the term of this patent is extended or adjusted under 35 U.S.C. 154(b) by 220 days.

(21) Appl. No.: 11/402,648

(22) Filed: Apr. 11, 2006

(65) Prior Publication Data
US 2008/0005401 A1   Jan. 3, 2008

(51) Int. Cl.
*G06F 3/00* (2006.01)
*G06F 5/10* (2006.01)
*G06F 5/14* (2006.01)

(52) U.S. Cl.
CPC .. *G06F 5/10* (2013.01); *G06F 5/14* (2013.01); *G06F 2205/062* (2013.01)

(58) Field of Classification Search
USPC ............... 365/189; 370/395.4, 252, 412, 428; 345/553, 100; 375/351, 240.2; 710/57, 710/305, 310, 27, 52, 53; 711/110; 709/237, 238
See application file for complete search history.

(56) References Cited

U.S. PATENT DOCUMENTS

| | | | | |
|---|---|---|---|---|
| 5,241,644 A * | 8/1993 | Nomura et al. | .................. | 710/54 |
| 5,471,583 A * | 11/1995 | Au et al. | .......................... | 710/57 |
| 5,797,043 A * | 8/1998 | Lewis et al. | ...................... | 710/56 |
| 5,819,114 A * | 10/1998 | Behnke | ............................ | 710/57 |
| 5,841,771 A * | 11/1998 | Irwin et al. | ..................... | 370/360 |
| 5,862,136 A * | 1/1999 | Irwin | ......................... | 370/395.4 |
| 5,903,282 A * | 5/1999 | Schoner et al. | ................ | 345/558 |
| 5,982,672 A * | 11/1999 | Moon et al. | .............. | 365/189.02 |
| 6,434,170 B1 * | 8/2002 | Movshovich et al. | ......... | 370/536 |
| 7,003,059 B1 * | 2/2006 | Susnow et al. | ................. | 375/351 |
| 7,065,052 B1 * | 6/2006 | McBride | ........................ | 370/252 |
| 7,091,944 B2 * | 8/2006 | Wang | ............................ | 345/100 |
| 7,145,873 B2 * | 12/2006 | Luijten et al. | .................. | 370/230 |
| 7,196,710 B1 * | 3/2007 | Fouladi et al. | ................. | 345/553 |
| 7,328,332 B2 * | 2/2008 | Tran | ................................ | 712/238 |
| 7,392,354 B1 * | 6/2008 | Au et al. | ........................ | 711/154 |
| 2003/0101307 A1 * | 5/2003 | Gemelli et al. | ............... | 710/305 |
| 2004/0151198 A1 * | 8/2004 | Brown et al. | .................. | 370/412 |
| 2005/0163226 A1 * | 7/2005 | Chung | ..................... | 375/240.25 |

OTHER PUBLICATIONS

Weiss, Data Structures and Problem Solving Using C++, 2000, Addison Wesley, pp. 541-547.*
Widipedia, Codec, http://en.wikipedia.org/wiki/Codec, retrieved Jan. 30, 2011.*

* cited by examiner

*Primary Examiner* — Cheng-Yuan Tseng
*Assistant Examiner* — Jing-Yih Shyu

(57) ABSTRACT

A buffer controller includes a first write pointer generation module for generating a first write pointer that points to a first sequence of write locations in a buffer memory, that directs an input module to store a sequence of samples of a real-time signal in a buffer memory. A read pointer generation module generates a plurality of read pointers for a corresponding plurality of output modules, wherein each of the plurality of read pointers points to a sequence of read locations in the buffer memory, in a buffer order, that contain the sequence of samples.

15 Claims, 11 Drawing Sheets

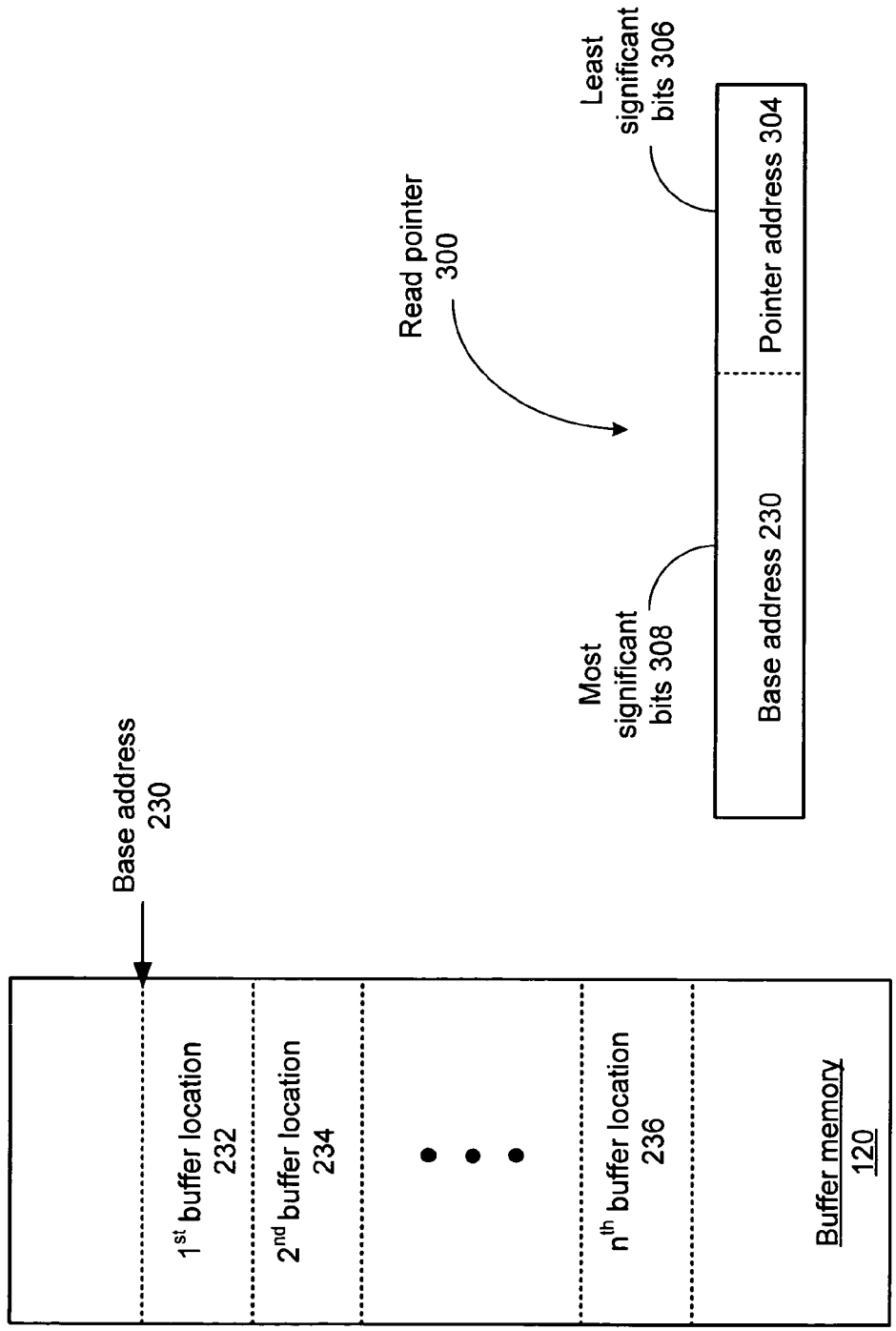

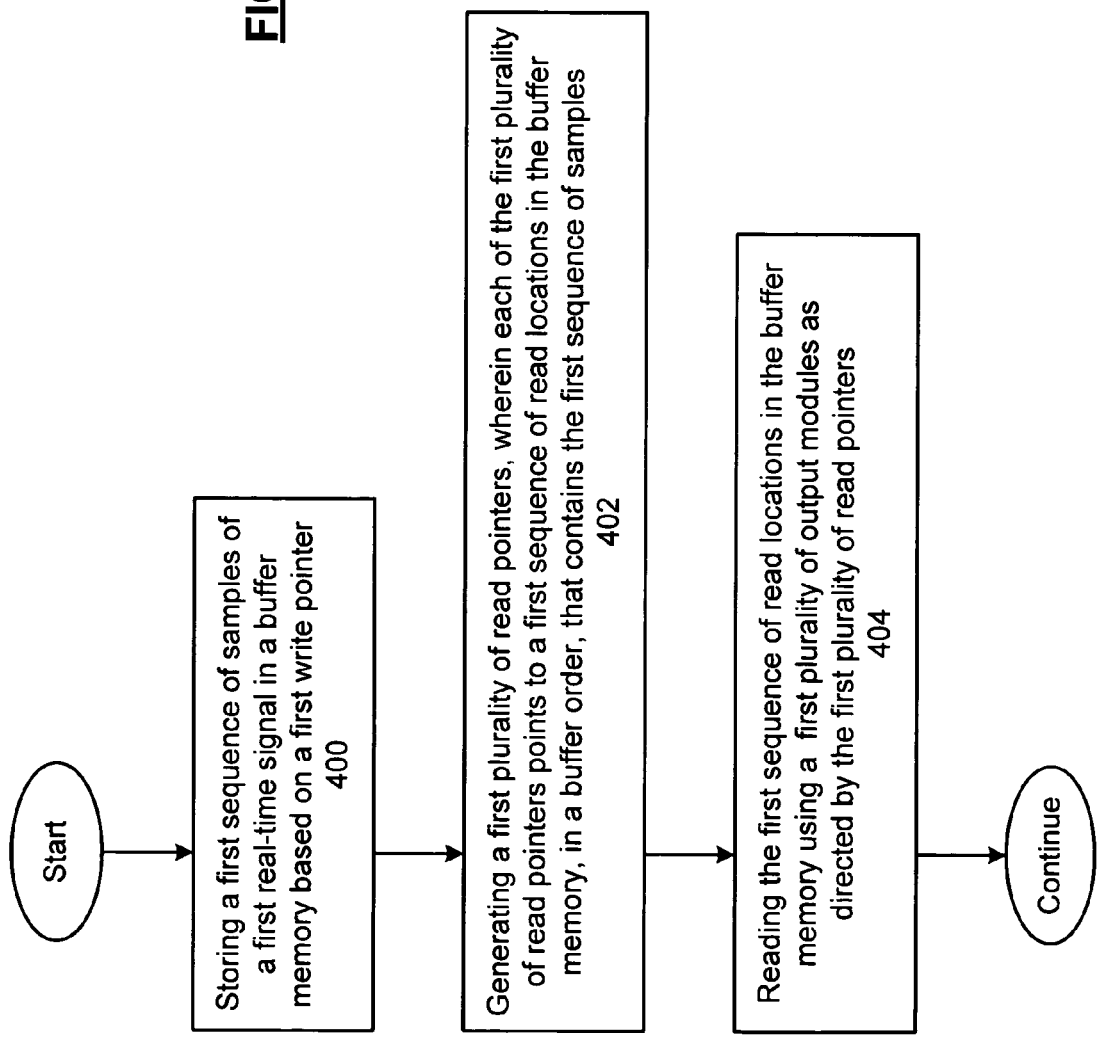

BUFFER CONTROLLER, CODEC AND METHODS FOR USE THEREWITH

BACKGROUND OF THE INVENTION

1. Technical Field of the Invention

The present invention relates to buffer controller as may be used in codecs and related methods.

2. Description of Related Art

As is known, codecs are used in a wide variety of electronic devices that process real-time signals such as audio and/or video signals. Such devices include laptop, notebook and other personal computers, personal digital assistants (PDA), compact disk (CD) players, Motion Picture Experts Group (MPEG3) or (MP3) players, digital video disk (DVD) players, amplitude modulation/frequency modulation (AM/FM) radios, satellite radios, cellular telephones, etc. As an example, a computer may include an audio codec integrated circuit to support the processing of audio signals in order to produce an audio output that is delivered to the user through speakers, headphones or the like and a video codec for playing streaming video or DVD video content on the computer's display screen.

Codecs typically include a buffer to support the processing of the real-time signal. When multiple real-time signals are present, multiple buffers are required. The need exists for codecs that can be efficiently implemented in an integrated circuit environment.

BRIEF DESCRIPTION OF THE SEVERAL VIEWS OF THE DRAWINGS

FIG. 5 presents a graphical representation of a buffer memory in accordance with an embodiment of the present invention.

FIG. 6 presents a graphical representation of a read pointer in accordance with an embodiment of the present invention.

FIG. 9 presents a flowchart representation of a method in accordance with the present invention.

DETAILED DESCRIPTION OF THE INVENTION INCLUDING THE PRESENTLY PREFERRED EMBODIMENTS

Figure 1:
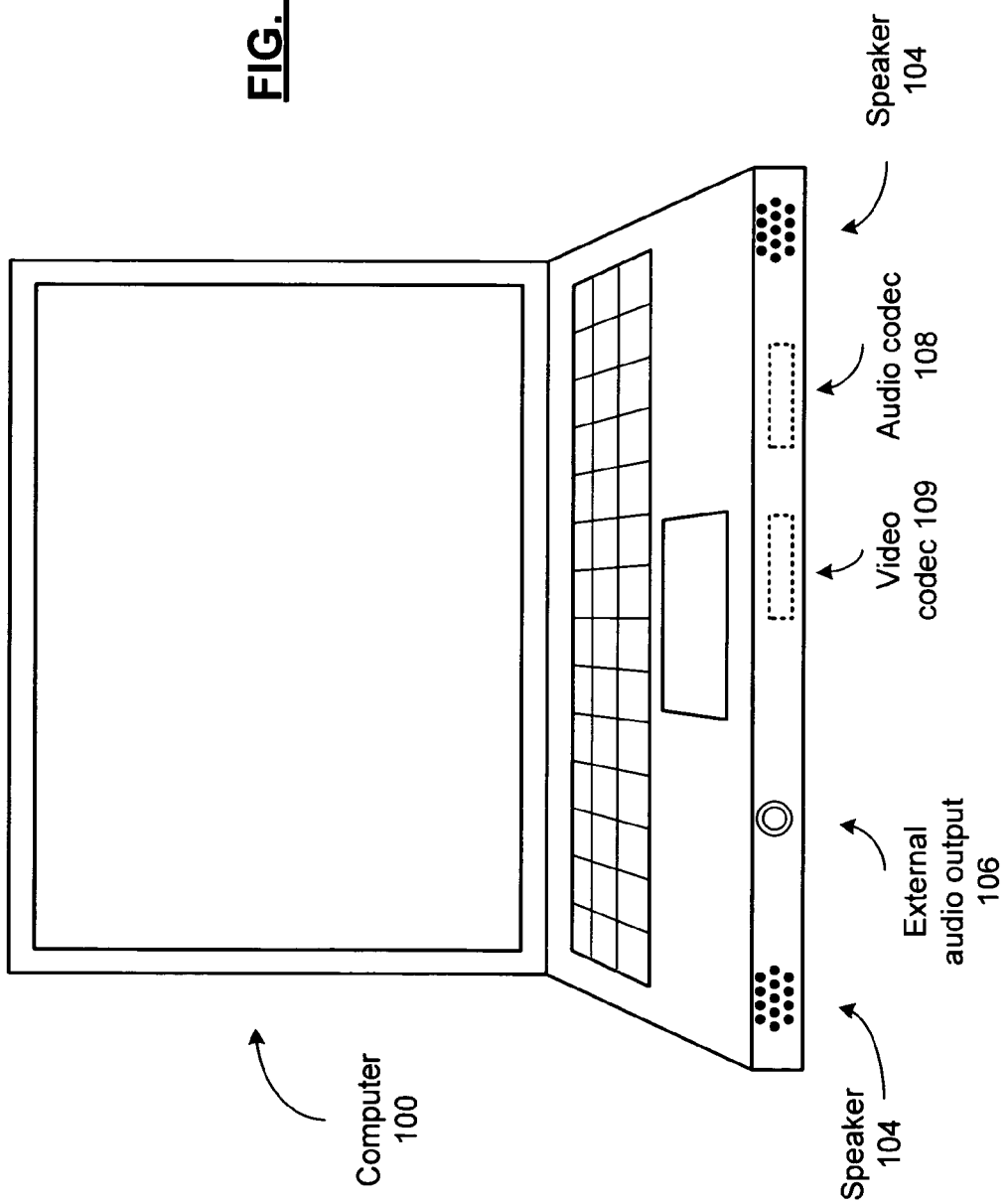
FIG. 1 presents a pictorial view of a computer in accordance with an embodiment of the present invention.

FIG. 1 presents a pictorial view of a computer in accordance with an embodiment of the present invention. In particular, computer 100 includes integrated speakers 104 for converting audio signals, derived from streaming audio, stored audio files such as MP3 files or other audio file formats, or played from a compact disk, that are processed by audio codec 108 into an audio output. In addition, computer 100 includes an external audio output 106 such as an output jack, for coupling an audio signal to external audio devices such as external speakers, a stereo system or other devices that reproduce, process or store audio signals.

Further, computer 100 includes a video codec 109 for processing video signals derived from streaming video, stored video files in a digital video format such as MPEG1, MPEG2, MPEG4 or other digital video format, or played from a DVD for display on the display screen of computer 100.

Audio codec 108 and/or video codec 109 include various features and functions in accordance with the present invention that will be described in conjunction with the figures that follow.

Figure 2:
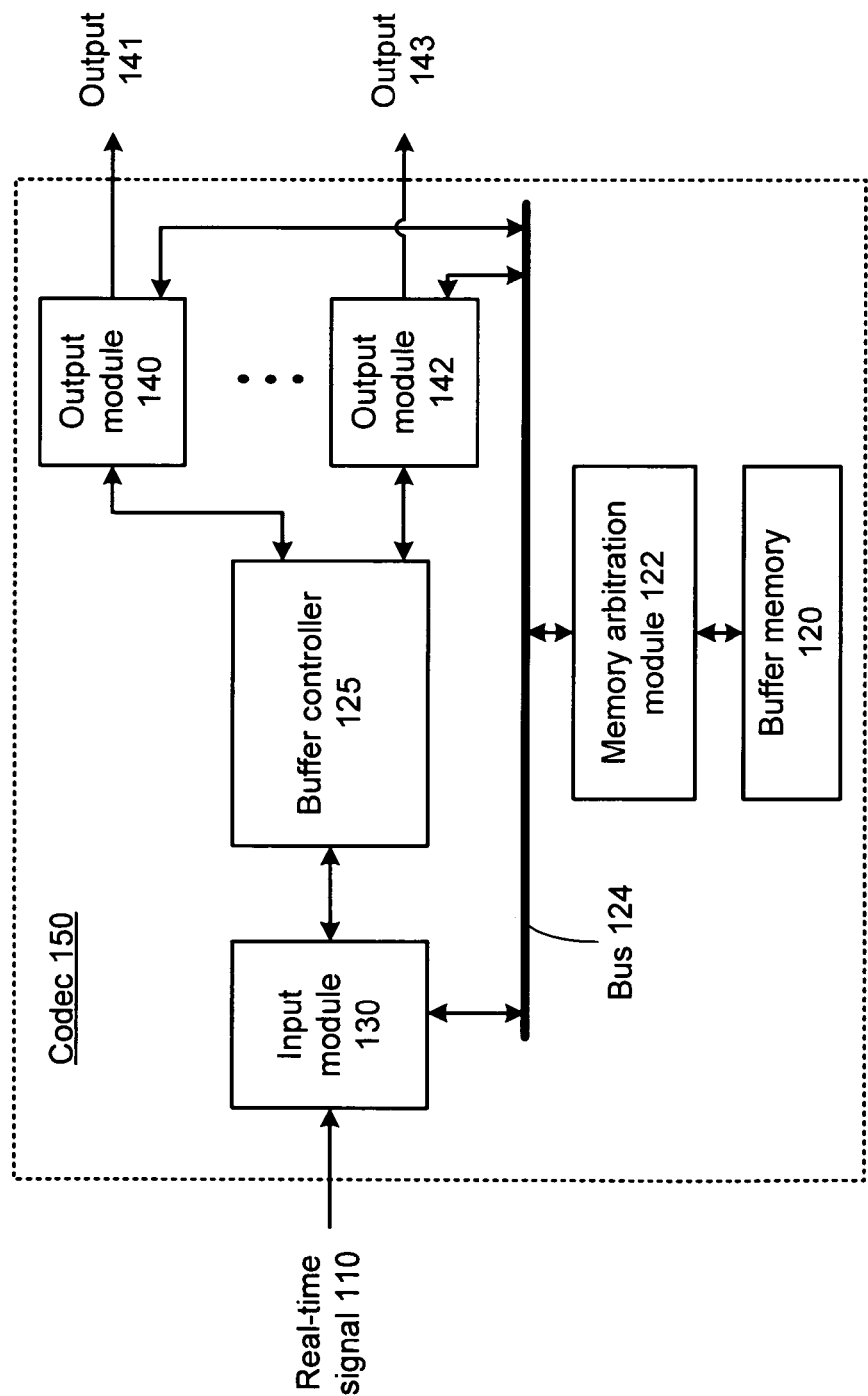
FIG. 2 presents a block diagram representation of a codec in accordance with an embodiment of the present invention.

FIG. 2 presents a block diagram representation of a codec in accordance with an embodiment of the present invention. In particular, a codec 150 is shown that includes a buffer memory 120, memory arbitration module 122 and bus 124. An input module 130 is included for storing a sequence of samples of a first real-time signal 110 in the buffer memory. A buffer controller 125 controls the buffering of the samples of real-time signal 110 in a buffer order such as a first-in first-out order. However different buffer orders can likewise be implemented depending on the implementation of input module 110 and output modules 140 and 142.

In an embodiment of the present invention, codec 150 is an audio codec such as codec 108 and the first real-time signal is an audio signal and the sequence of samples can be 24-bit samples of an audio signal at a sampling frequency such as 44 kHz, and pulse code modulated, however, greater or lesser bit accuracy such as 16 bits or 32 bits can likewise be used, other modulation schemes and differing sample frequencies may also be employed. In an embodiment of the present invention, codec 150 is a video codec such as video codec 109 and real-time signal 110 is a video signal.

Output modules 140 and 142 are operably coupled to the buffer memory 120, memory arbitration module 122 and the buffer controller 125. Output modules 140 and 142 are each operable for reading a sequence of read locations in the buffer memory as directed by corresponding read pointers generated by buffer controller 125. In an embodiment of the present invention output modules 140 and/or 142 can include digital to analog converters that produce outputs 141 and 143, such as an analog audio output, from the buffered sequence of samples. While two output modules 140 and 142 are shown, a greater number of output modules can likewise be coupled to buffer controller 125. In this fashion, multiple output modules 140, 142, etc., can access real-time signal 110 via a multiple access buffer structure implemented by buffer controller 125. Further details regarding the implementation of buffer controller 125 including additional functions and features are presented in association with the figures that follow.

In an embodiment of the present invention, memory arbitration module 122 controls access to the buffer memory by the input module 130 and the output modules 140 and 142. Memory arbitration module 122 receives write requests from input module 130 and sends acknowledgements to input module 130 when a sample can be written to the buffer memory 120. Similarly, memory arbitration module 122 receives read requests from output modules 140 and 142 and sends acknowledgements to the output module 140 when a sample can be read from the buffer memory 120.

Figure 3:
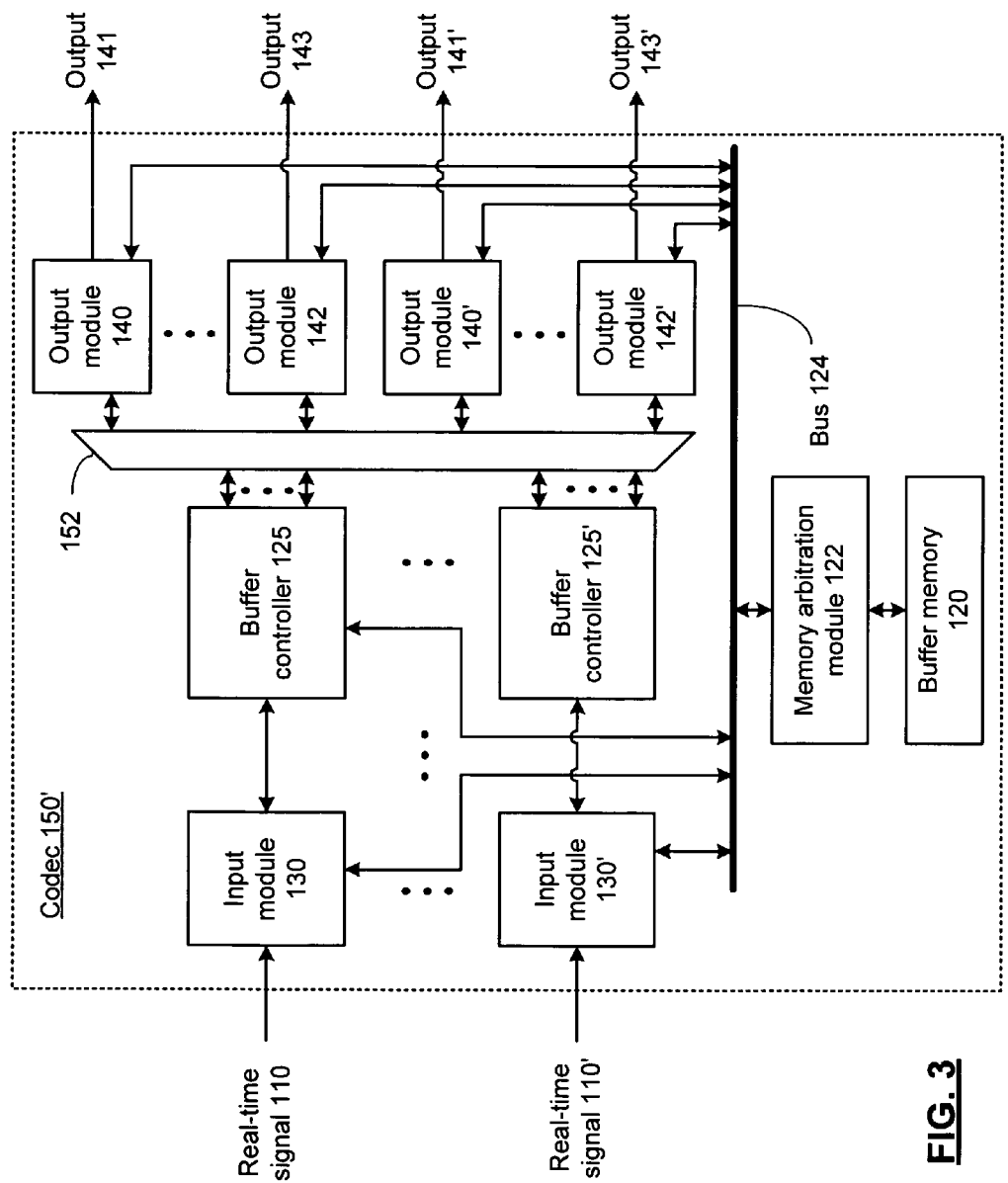
FIG. 3 presents a block diagram representation of a codec in accordance with an embodiment of the present invention.

FIG. 3 presents a block diagram representation of a codec in accordance with an embodiment of the present invention. In particular, a codec 150' is presented that processes a plurality of real-time signals 110, 110' etc., using a plurality of buffer controllers 125, 125', etc. A multiplexer 152 is included for selectively coupling the output modules (such as output modules 140, 142, 140' and 142') to the buffer controllers 125 or 125' for alternatively accessing a buffered real-time signal 110, 110' and producing outputs 141, 143, 141', 143' or optionally being idle.

Figure 4:
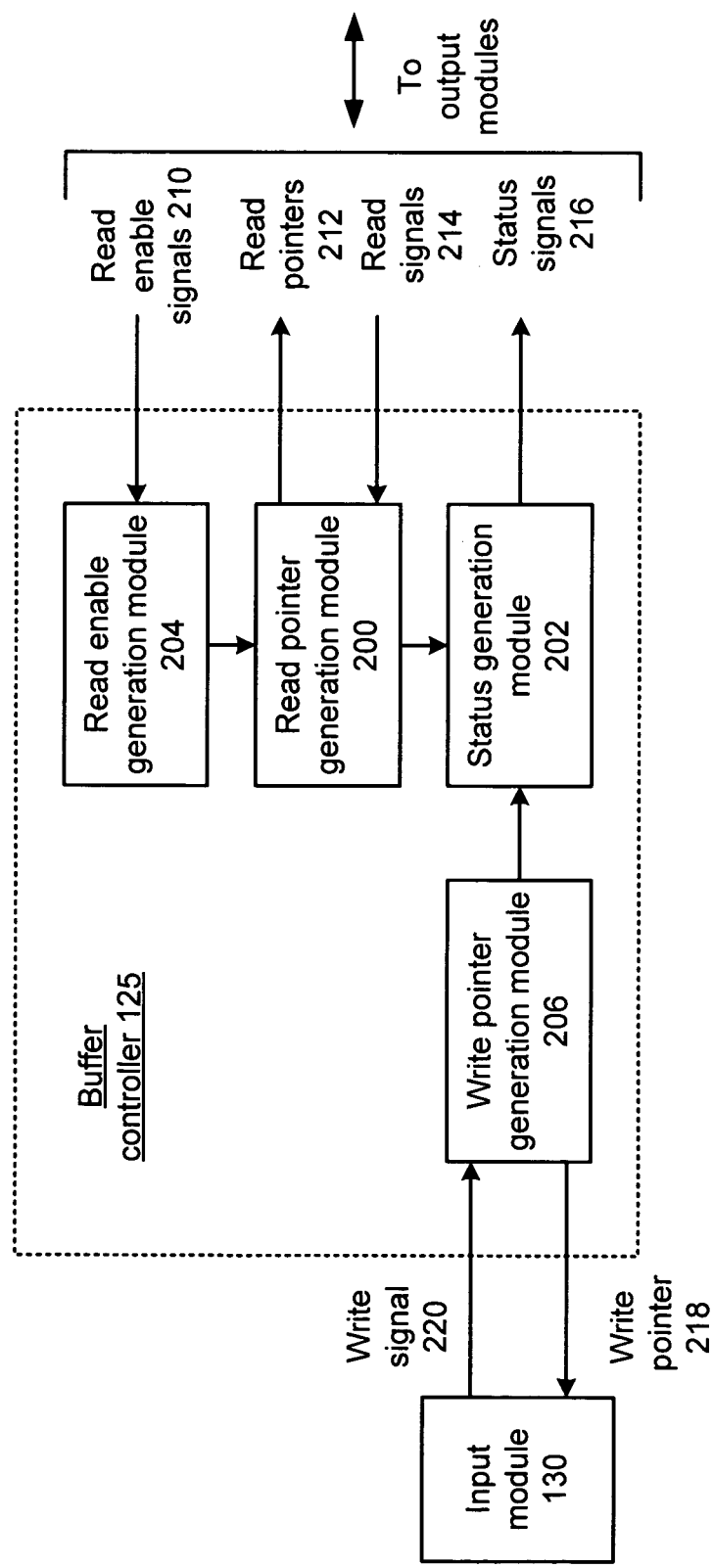
FIG. 4 presents a block diagram representation of a buffer controller in accordance with an embodiment of the present invention.

FIG. 4 presents a block diagram representation of a buffer controller in accordance with an embodiment of the present invention. In particular, buffer controller 125 includes a write pointer generation module 206, operably coupled to the first input module 206, for generating a write pointer 218 that points to a first sequence of write locations in the buffer memory. In an embodiment, buffer controller 125 uses a contiguous block of memory locations of buffer memory 120 to buffer input signal 110. Write pointer 218 is used by input module 130 to determine the particular location in buffer memory 120 to store the next sample of the sequence of samples of real-time signal 110. When the next sample is stored in buffer memory 120, input module 130 generates write signal 220 that is used trigger write pointer generation module 206 to update the write pointer 218 to the next buffer location. In an embodiment of the present invention, the write pointer 218 updated by incrementing the write pointer until the last buffer location is reached and then resetting the write pointer to correspond to the first buffer location. However, other schemes for updating the write pointer 218 can likewise be used including decrementing the write pointer, etc.

Read enable module 204 receives read enable signals from any of the output modules 140, 140', 142, 142', etc. to determine which of the output modules are coupled to read the buffered sequence of samples from the corresponding input module 130. Buffer controller 125, in turn, generates read pointers 212 and status signals 216 in response to the received read signals 214 and the write pointer 218, for each of the output modules that have supplied read enable signals 210. In an embodiment of the present invention, read pointer generation module 200 automatically generates read pointers 212 for output modules 140, 140', 142, 142', etc., even when the read enable signal for a particular output module is deasserted. In this case, the read pointer is advanced when all remaining read pointers 212 have been advanced. This simplifies the operation of status generation module 202 since it can assess all of the read pointers 212 without first checking which read enable signals 210 are asserted. Further, this embodiment provides the advantage that all the read pointers 212 are updated. If an output module comes on-line and sets its read enable signal 210, the corresponding read pointer 212 is ready.

Buffer controller 125 further includes read pointer generation module 200 for generating a plurality of read pointers 212, wherein each of the first plurality of read pointers points to a sequence of read locations in the buffer memory, in a buffer order such as first-in first-out, that contain the sequence of samples of real-time signal 110. As the samples are read from buffer memory, read pointer generation module 200 directs the output modules 140, 142, etc. to the next locations to be read from the buffer memory 120.

In operation, when a particular output module completes a read operation that reads the location in the buffer memory corresponding to the read pointer 212, the output module generates a read signal 214 that triggers read pointer generation module 200 to update the read pointer 212, (in a fashion similar to the updating of the write pointer as previously described) that corresponds to that particular output module.

In this fashion, each of the output modules 140, 142, etc. can independently access the buffer memory and the sequence of samples of real-time signal 110. Read pointer generation module updates each of the read pointers 212 independently based on the read status of each output modules 140, 142, etc.

In an embodiment of the present invention, buffer controller 125 further includes a status generation module 202, operably coupled to the buffer memory and the first read pointer generation module, for determining a status for each of the first plurality of output modules. In particular, the status generation module determines a ready state, an overflow state and an underflow state for each of the output modules 140, 142, etc. with respect to the buffer. The status generation module 202 is further operable to determine if the buffer memory 120 is in an empty state or a full state. Status generation module is capable of generating a status signal to output modules 140, 142, etc., that indicates the state to further control the buffering process. In an embodiment of the present invention, the status signal is a 3-bit digital signal having unique digital values for empty, full, ready, underflow and overflow; however other signaling schemes may likewise be employed within the broad scope of the present invention.

In an embodiment, the status generation module 202 determines an empty state and generates a status signal corresponding to an empty signal when a particular output module has read each of the sequence of samples stored in the buffer memory and the input module has not stored the next sample. This is the case when the read pointer generation module updates the read pointer 212 for that particular output module to a value that matches the value of write pointer 218. In an embodiment of the present invention, one or more of the output modules 140, 142, etc., is an asynchronous module that, in response to a empty status signal, decelerates its read operations from the buffer, such as by executing an interrupt that begins one or more read operations at a later time, or by decreasing the clock frequency driving the read operations of the particular output module for a period or time in order to avoid "getting ahead" of the input module 130. In an embodiment of the present invention, the particular output module responds to the empty signal by muting its corresponding output—such as by producing an output signal corresponding to ground, a direct current (DC) level or otherwise producing an output signal without an audio or video component.

Likewise when the status generation module 202 determines that a output module has overflowed the buffer by the input module 130 overwriting a buffer location with a new sample value prior to the old sample value being read by the particular output module, or underflowing the buffer by an output module reading a buffer location prior to the location being written with the current sample of the real-time signal 110, the status generation module responds by generating a status signal corresponding to either an overflow signal or an underflow signal, depending on the case. In an embodiment of the present invention, the particular output module responds to the overflow and underflow signals by also muting its corresponding output.

When the status generation module 202 determines a full state, when the input module 130 has written to the last available buffer location for a particular output module i.e. the write pointer 218 is one location behind the read pointer 212 for that particular output module), a full signal is generated. In an embodiment of the present invention one or more of the output modules 140, 142, etc., is an asynchronous module that, in response to a full status signal, accelerates its read operations from the buffer, such as by executing an interrupt that begins one or more read operations early, or by increasing the clock frequency driving the read operations of the particular output module for a period or time in order to reduce the back-log of unread samples. Alternatively, for output modules 140, 142, etc., that are synchronous modules, these output modules mute their corresponding output if the status progresses to an overflow condition, as discussed above.

In an embodiment of the present invention, the ready status is determined for a particular output module and a ready signal is generated when none of the empty, full, overflow or underflow conditions apply. In an embodiment of the present invention, during start-up conditions, an empty status signal is generated and the output modules 140, 142, etc., are muted in response. When the output modules 140, 142, etc., begin reading samples from the buffer, the status is changed to ready.

In an embodiment of the present invention, the empty, full, overflow, underflow and ready signals are generated to each of the output modules based on their particular status. In other words, at any given time, each of these signals is generated to the particular subset of all output modules (from all to none) that this particular signal status currently applies. However, in an embodiment of the present invention, the status of any of the output modules 140, 142, etc. in the empty, full, overflow or underflow status causes the status generation module 202 to generate a corresponding status signal 212 to all of the output modules 140, 142 coupled to buffer controller 125.

In an embodiment of the present invention, buffer controller 125 can be implemented using a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, in an embodiment of the present invention operation instructions are stored in locations of buffer memory 120 that are reserved for this purpose and not used for storing samples of the real-time input-signals 110, 110', etc.

While operation of buffer controller 125 has been described, buffer controller 125' can operate similarly in accordance with one or more of the alternative embodiments described herein.

FIG. 5 presents a graphical representation of a buffer memory in accordance with an embodiment of the present invention. In particular, buffer memory 120 includes a plurality of buffer locations that begin with a first buffer location 232 at a base address 230 and continue with a second buffer location 234 at the next address and a plurality of other consecutive buffer locations at consecutive addresses, up to the nth buffer location 236.

In an embodiment of the present invention, n=16 is used, however greater or lesser value can be used within the broad scope of the present invention, based upon the amount of buffering required, the amount of signal latency that can be tolerated, etc. In the event that multiple buffer controllers 125, 125', etc. are implemented, a plurality of separate buffer locations are reserved for each buffer controller. The multiple buffers may be of the same size or of different sizes, particularly if the sample rate varies for different output modules 140, 142, 140', 142' etc. Each of the output modules 140, 142, etc., coupled to a single input module 130 operate with generally the same sample rate. A different input module 130', and the output modules 140', 142' etc. coupled thereto may operate at a different sample rate.

FIG. 6 presents a graphical representation of a read pointer in accordance with an embodiment of the present invention. In particular, a read pointer is generated by concatenating the base address 230 and a pointer address 304 having $\log_2$ (n) bits for a buffer with n buffer locations. In particular, each of the first plurality of read pointers 212 has a plurality of least significant bits 306 and a plurality of most significant bits 308 and wherein the pointer address 304 is included in the least significant bits 306 and the base address 230 is included in the most significant bits 308 such that each of the plurality of read pointers 212 is a physical memory address in buffer memory 120. In this fashion, the read pointers 212 can be updated to each of the output modules 140, 142, etc., by updating only the pointer address 304.

Figure 8:
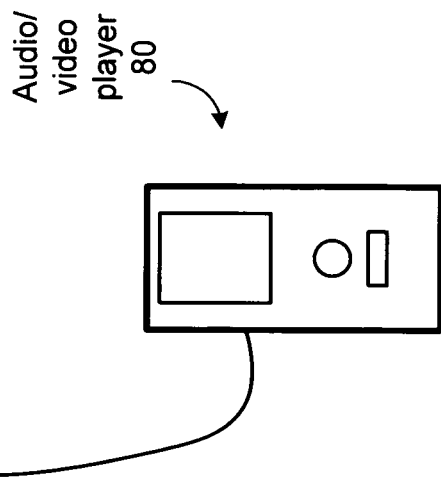
FIGS. 7-8 present a pictorial diagram representation of a CD player and audio/video player in accordance with an embodiment of the present invention.
Figure 7:
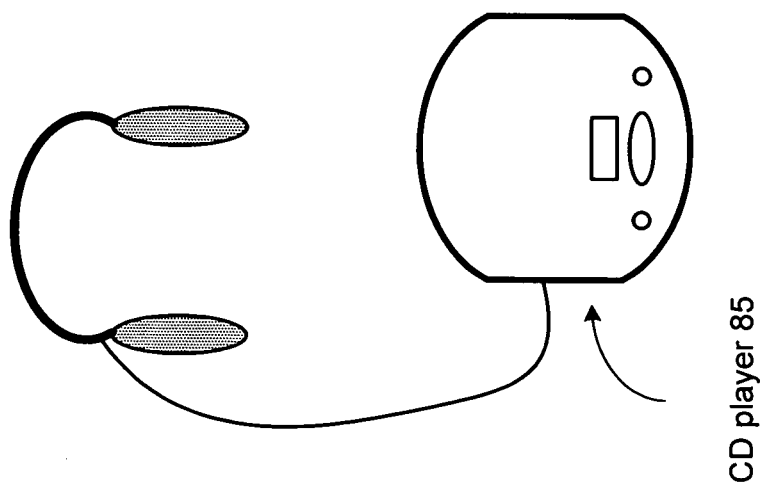

FIGS. 7-8 present a pictorial diagram representation of a CD player and audio/video player in accordance with an embodiment of the present invention. While codec 150 has been presented in terms of audio codec 108 and/or video codec 109 are used in computer 100, codec 150 may likewise be implemented by itself in software, as a hardware module that includes one or more integrated circuits such as system on a chip integrated circuits, that are incorporated in other devices such as CD player 85, audio/video player 80, or in voice recorders, cell-phones, and other electronic devices that process real-time signals.

FIG. 9 presents a flowchart representation of a method in accordance with the present invention. In particular, a method is presented for use with one or more of the features and functions described in association with FIGS. 1-8. In step 400, a first sequence of samples of a first real-time signal are stored in a buffer memory based on a first write pointer. In step 402, a first plurality of read pointers are generated, wherein each of the first plurality of read pointers points to a first sequence of read locations in the buffer memory, in a buffer order, that contain the first sequence of samples. In step 404, the first sequence of read locations in the buffer memory are read using a first plurality of output modules as directed by the first plurality of read pointers.

In an embodiment of the present invention, each of the first plurality of read pointers includes a base address in the buffer memory and a pointer address in the buffer memory. Each of the first plurality of read pointers has a plurality of least significant bits and a plurality of most significant bits, wherein the pointer address is included in the least significant bits and the base address is included in the most significant bits such that each of the plurality of read pointers is a physical memory address. In an embodiment, the buffer order is first-in first-out and the real-time signal is either an audio signal or a video signal. Further in an embodiment, step 402 includes updating one of the first plurality of read pointers when a corresponding one of the first plurality of output modules completes a read operation from the buffer memory.

In an embodiment of the present invention, during start-up conditions, an empty status signal is generated. The first plurality output modules are muted in response, until step 404 when the first plurality output modules begin reading the first sequence of read locations from the buffer.

Figure 10:
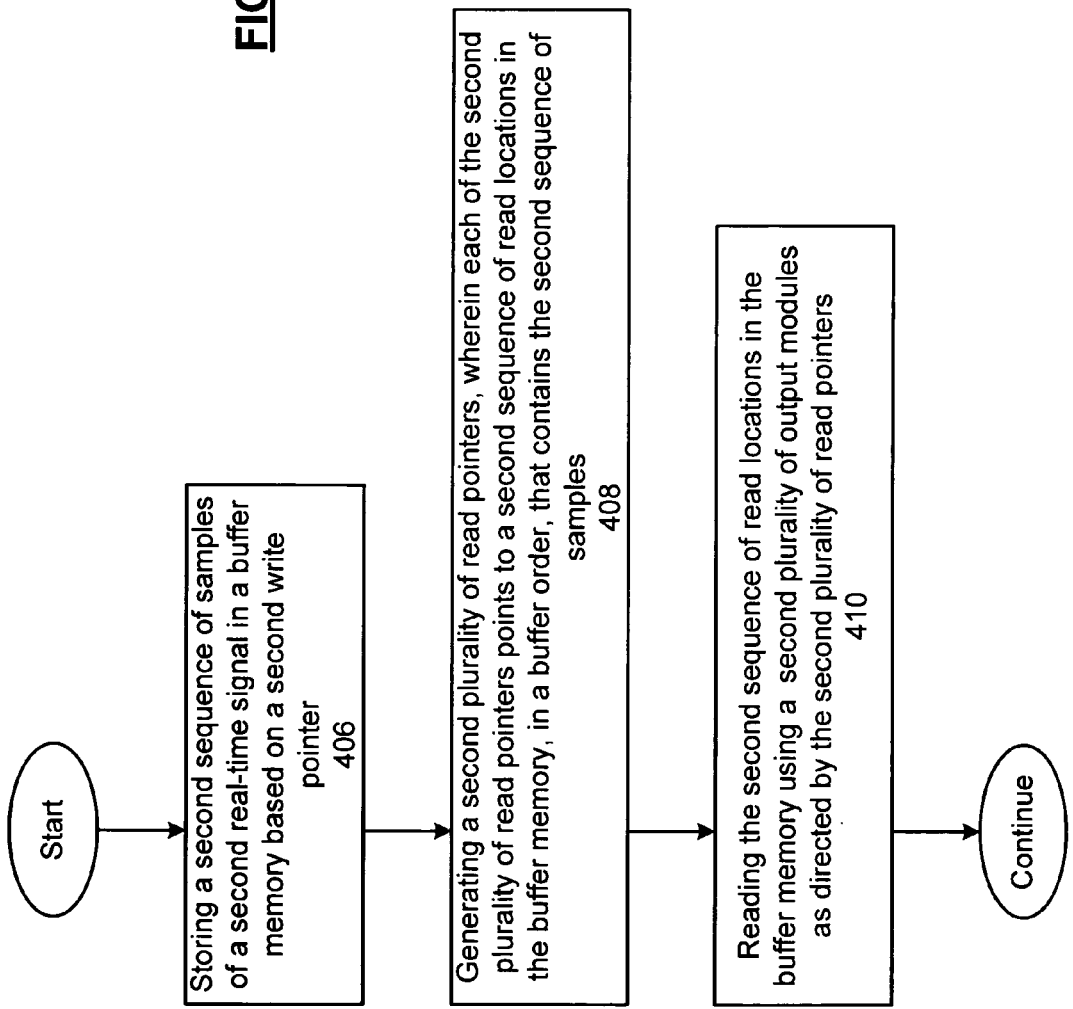
FIG. 10 presents a flowchart representation of a method in accordance with the present invention.

FIG. 10 presents a flowchart representation of a method in accordance with the present invention. In particular a method is presented for use with the method of FIG. 9. In step 406, a second sequence of samples of a second real-time signal are stored in the buffer memory based on a second write pointer. In step 408, a second plurality of read pointers are generated, wherein each of the second plurality of read pointers points to a second sequence of read locations in the buffer memory, in the buffer order, that contain the second sequence of samples. In step 410, the second sequence of read locations in the buffer memory are read using a second plurality of output modules as directed by the second plurality of read pointers.

Figure 11:
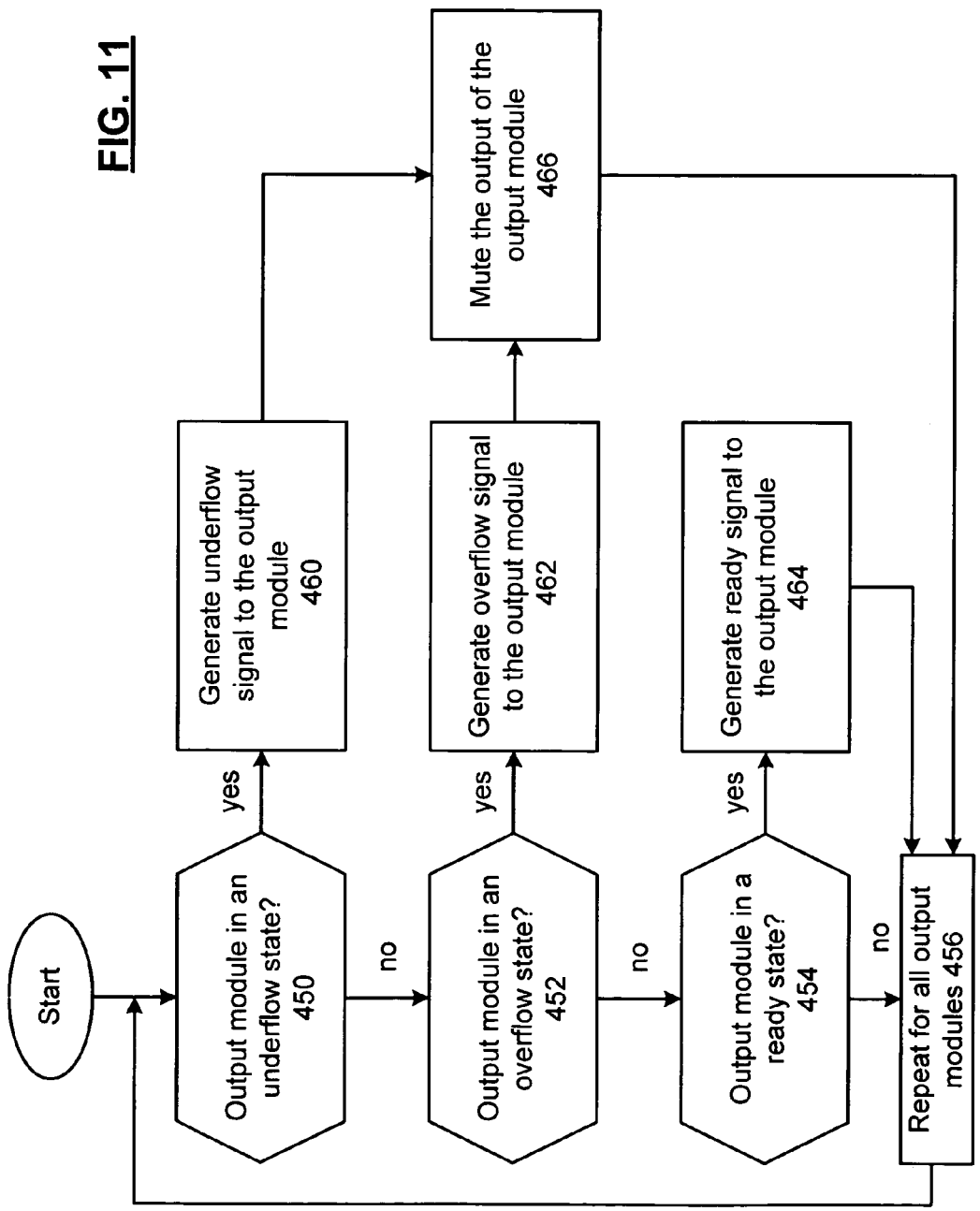
FIG. 11 presents a flowchart representation of a method in accordance with the present invention.

FIG. 11 presents a flowchart representation of a method in accordance with the present invention. In particular, a method is presented for use in conjunction with one or more of the features and functions described in association with FIGS. 1-10. In step 450, the method determines if an output module is in an underflow state. In step 460, an underflow signal is generated to the output module if the output module is in the underflow state. If not, the method proceeds to step 452 where the method determines if an output module is in an overflow state. If so, an overflow signal is generated to the output module as shown in step 462, if not the method proceeds to step 454. If an underflow signal or an overflow signal is generated, the output module is muted as shown in step 466. In step 454, the method determines if the output module is in a ready state, if so, a ready signal is generated as shown in step 464. In step 456, the method is shown to be repeated for all output modules.

Figure 12:
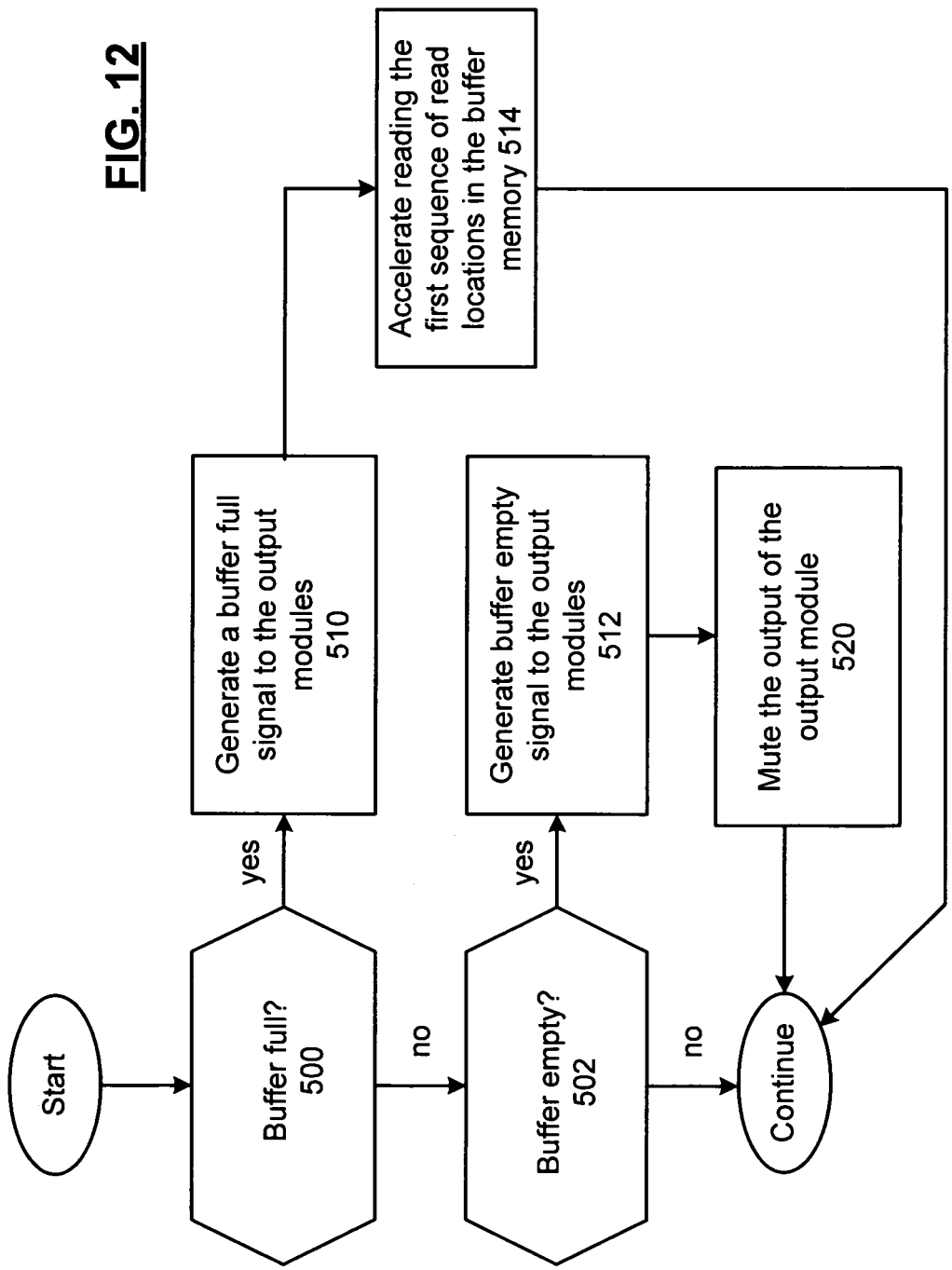
FIG. 12 presents a flowchart representation of a method in accordance with the present invention.

FIG. 12 presents a flowchart representation of a method in accordance with the present invention. In particular, a method is presented for use in conjunction with one or more of the features and functions described in association with FIGS. 1-11. In step 500, the method determines if the buffer is full. If so a buffer full signal is generated to the output modules 510 and the reading of the first sequence of read locations in the buffer memory is optionally accelerated as shown in step 514. If the buffer is not full, the method proceeds to step 502 to determine if the buffer is empty. If so, a buffer empty signal is generated to the output modules as shown in step 512 and the output of the output modules is muted as shown in step 520.

Figure 13:
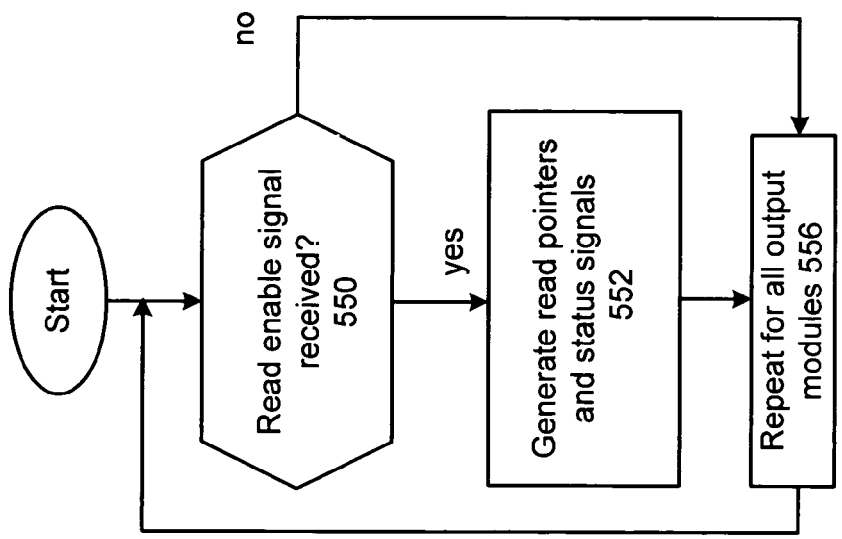
FIG. 13 presents a flowchart representation of a method in accordance with the present invention.

FIG. 13 presents a flowchart representation of a method in accordance with the present invention. In particular, a method is presented for use in conjunction with one or more of the features and functions described in association with FIGS. 1-12. The method determines which of the plurality of output modules is operatively coupled to read the first sequence of read locations. In step 550, the method determines if a read enable signal is received from an output module. If so, the method proceeds to generate a read pointers and status signals for that output module as shown in step 552. In either case, the method repeats for all output modules as shown in step 556.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In preferred embodiments, the various circuit components are implemented using 0.35 micron or smaller CMOS technology. Provided however that other circuit technologies including other transistor, diode and resistive logic, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

As the term module is used in the description of the various embodiments of the present invention, a module includes a functional block that is implemented in hardware, software, and/or firmware that performs one or multiple functions such as the processing of an input signal to produce an output signal. As used herein, a module may contain submodules that themselves are modules.

Thus, there has been described herein an apparatus and method, as well as several embodiments including a preferred embodiment, for implementing a codec and buffer controller. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A method comprising:
   incrementing a first write pointer of a first pointer module a plurality of times to store a first sequence of samples of a first real-time signal in a buffer order at a first sequence of locations of a buffer memory based on the first write pointer;
   incrementing a second write pointer of a second pointer module a plurality of times to store a second sequence of samples of a second real-time signal in buffer order at a second sequence of locations of the buffer memory based on the second write pointer;
   generating a first read pointer by the first pointer module for use by a first output module, wherein, when generated, the first read pointer points to an initial location of the first sequence of locations that stores the first sequence of samples;
   generating a second read pointer by the first pointer module for use by a second output module, wherein, when generated, the second read pointer points to the initial location of the first sequence of locations that stores the first sequence of samples;

generating a third read pointer by the second pointer module for use by the first output module, wherein, when generated, the third read pointer points to an initial location of the second sequence of locations that stores the second sequence of samples;

generating a fourth read pointer by the second pointer module for use by the second output module, wherein, when generated, the fourth read pointer points to the initial location of the second sequence of locations that stores the second sequence of samples;

in response to receiving at the first pointer module a first read enable signal from the first output module, enabling the first pointer module to provide read pointers to the first output module, including the first read pointer;

in response to receiving at the first pointer module a first read signal from the first output module subsequent to providing the first read pointer to the first pointer module, incrementing the first read pointer;

in response to receiving at the first pointer module a second read enable signal from the second output module, enabling the first pointer module to provide read pointers to the second output module, including the second read pointer;

in response to receiving at the second pointer module a second read signal from the second output module subsequent to providing the second read pointer, incrementing the second read pointer;

in response to receiving at the second pointer module a third read enable signal from the first output module, enabling the second pointer module to provide read pointers to the first output module, including the third read pointer;

in response to receiving at the second pointer module a third read signal from the first output module subsequent to providing the third read pointer, incrementing the third read pointer;

in response to receiving at the second pointer module a fourth read enable signal from the second output module, enabling the second pointer module to provide read pointers to the first output module, including the fourth read pointer; and in response to receiving at the second pointer module a fourth read signal from the second output module subsequent to providing the fourth read pointer, incrementing the fourth read pointer.

2. A method comprising:

incrementing a first write pointer of a first pointer module a plurality of times to store a first sequence of samples of a first real-time signal in a buffer order at a first sequence of locations of a buffer memory based on the first write pointer;

incrementing a second write pointer of a second pointer module a plurality of times to store a second sequence of samples of a second real-time signal in buffer order at a second sequence of locations of the buffer memory based on the second write pointer;

generating a first read pointer by the first pointer module for use by a first output module, wherein, when generated, the first read pointer points to an initial location of the first sequence of locations that stores the first sequence of samples;

generating a second read pointer by the first pointer module for use by a second output module, wherein, when generated, the second read pointer points to the initial location of the first sequence of locations that stores the first sequence of samples;

generating a third read pointer by the second pointer module for use by the first output module, wherein, when generated, the third read pointer points to an initial location of the second sequence of locations that stores the second sequence of samples;

generating a fourth read pointer by the second pointer module for use by the second output module, wherein, when generated, the fourth read pointer points to the initial location of the second sequence of locations that stores the second sequence of samples;

in response to receiving a read signal at the first pointer module from the first output module subsequent to providing the first read pointer to the first output module, incrementing the first read pointer and providing the updated first read pointer to the first output module, otherwise not incrementing the first read pointer;

in response to receiving a read signal at the first pointer module from the second output module subsequent to providing the first read pointer to the second output module, incrementing the second read pointer and providing the updated second read pointer to the second output module, otherwise not incrementing the first read pointer;

in response to receiving a read signal at the second pointer module from the first output module subsequent to providing the third read pointer to the first output module, incrementing the third read pointer and providing the updated third read pointer to the first output module, otherwise not incrementing the first read pointer; and in response to receiving a read signal at the second pointer module from the second output module subsequent to providing the fourth read pointer to the second output module, incrementing the fourth read pointer and providing the updated fourth read pointer to the second output module, otherwise not incrementing the first read pointer.

3. The method of claim 2 further comprising:

determining, at a first status generation module, a first status, from a plurality of possible statuses, for the first output module and a second status, from the plurality of possible statuses, for the second output module, wherein the plurality of possible statuses includes a ready state that indicates a sample of the sequence of samples is available to be read by an output buffer.

4. The method of claim 3 further comprising:

in response to determining that a read enable signal has been received at a first read enable generation module from the first output module, providing the first status from the first status generation module to the first output module, otherwise not providing the first status to the first output module; and in response to determining that a read enable signal has been received at the first read enable generation module from the second output module, providing the second status from the first status generation module to the second output module, otherwise not providing the second status to the second output module.

5. The method of claim 4 further comprising:

determining, at a second status generation module, a third status, from the plurality of possible statuses, for the first output module, and a fourth status, from the plurality of possible statuses, for the second output module;

in response to determining that a read enable signal has been received at a second read enable generation module from the first output module, providing the third status from the second status generation module to the first output module, otherwise not providing the third status to the first output module; and in response to determining that read enable signal has been received at the second read enable module from the second output module, providing the fourth status from the second status generation module to the second output module, otherwise not providing the fourth status to the second output module 6. The method of claim 5 wherein determining the first status is based upon the first write pointer and the first read pointer, the second status is based upon the first write pointer and the second read pointer, the third status is based upon the second write pointer and the third read pointer, and the fourth status is based upon the second write pointer and the fourth read pointer.

7. The method of claim 5, wherein the plurality of statuses includes an underflow state that indicates the pointer of an output buffer points to location that does not include a valid sample.

8. The method of claim 7 further comprising:
determining, at the first output module, the first status;
in response to the first status being the ready state, the first output module retrieves a sample of the first real-time signal from the buffer memory based upon the first read pointer, and provides a read signal to the first pointer module to request an updated first pointer, wherein the first output module provides one of an audio signal or a video signal based upon the retrieved sample.

9. The method of claim 8 further comprising:
in response to the first status being the underflow state, the first output module produces a muted output signal.

10. The method of claim 5, wherein the plurality of statuses includes an overflow state that indicates that a sample at one of the first sequence of locations was overwritten by a new sample before being accessed by the first output module.

11. The method of claim 10 further comprising:
determining, at the first output module, a the first status;
in response to the first status being the ready state, the first output module retrieves a sample of the first real-time signal from the buffer memory based upon the first read pointer, and provides a read signal to the first pointer module to request an updated first pointer, wherein the first output module produces and output signal that is one of an audio signal or a video signal based upon the retrieved sample; and
in response to the first status being the overflow state, the first output module produces a muted output signal.

12. The method of claim 11, wherein the plurality of statuses includes a full state that indicates that indicates the first sequence of locations is full; and
in response to the first status being the full state, the first output module accelerates read operations from the first sequence of locations.

13. The method of claim 11, wherein the plurality of statuses includes an empty state that indicates that indicates the first sequence of locations is empty; and
in response to the first status being the empty state, the first output module produces a muted output signal.

14. The method of claim 2, wherein the first sequence of samples is stored in a first-in-first-out memory.

15. The method of claim 2, each of the first pointer is stored at a first register and a base address of the first pointer is stored at a most-significant-bit portion of the first register, the second pointer is stored at a second register and a base address of the second pointer is stored at a most-significant-bit portion of the second register, the third pointer is stored at a third register and a base address of the third pointer is stored at a most-significant-bit portion of the third register, the fourth pointer is stored at a fourth register and a base address of the fourth pointer is stored at a most-significant-bit portion of the fourth register.

* * * * *